United States Patent [19]
Kissel

[11] Patent Number: 6,139,231
[45] Date of Patent: Oct. 31, 2000

[54] WHEEL RESTRAINT DEVICE

[75] Inventor: James L. Kissel, Rapid City, S. Dak.

[73] Assignee: Rushmore Vehicle Restraints, L.L.C., Rapid City, S. Dak.

[21] Appl. No.: 09/393,528

[22] Filed: Sep. 10, 1999

[51] Int. Cl.⁷ .................................................. B60P 7/08
[52] U.S. Cl. .................. 410/20; 410/10; 410/12
[58] Field of Search ..................... 410/7, 10–12, 410/20, 21, 23, 50, 97, 100; 248/499; 24/68 CD, 265 CD

[56] References Cited

U.S. PATENT DOCUMENTS

| | | |
|---|---|---|
| 509,747 | 11/1893 | Mauk . |
| 1,546,430 | 7/1925 | Blitz . |
| 1,708,231 | 4/1929 | Moore et al. . |
| 1,708,433 | 4/1929 | Stinson . |
| 1,748,089 | 2/1930 | Stockton . |
| 1,770,798 | 7/1930 | Nicholson ................................. 410/20 |
| 1,796,607 | 3/1931 | McDowell . |
| 1,816,897 | 8/1931 | Fedderman et al. . |
| 1,937,769 | 12/1933 | Lute . |
| 1,990,562 | 2/1935 | Otis ........................................... 410/20 |
| 2,001,935 | 5/1935 | Otis ........................................... 410/20 |
| 2,046,855 | 7/1936 | Tobin . |
| 2,055,829 | 9/1936 | Tobin ....................................... 410/20 |
| 2,856,865 | 10/1958 | Reynolds et al. . |
| 3,537,548 | 11/1970 | Jeppesen . |
| 3,793,681 | 2/1974 | Casstevens, Jr. et al. . |
| 3,891,176 | 6/1975 | Downing et al. . |
| 3,899,806 | 8/1975 | Berg . |
| 3,937,436 | 2/1976 | Stewart . |
| 3,953,812 | 4/1976 | Heft et al. . |
| 3,972,457 | 8/1976 | Kesler . |
| 4,227,633 | 10/1980 | Sellberg . |
| 4,399,893 | 8/1983 | Switzer . |
| 4,428,512 | 1/1984 | Nosek . |
| 4,479,746 | 10/1984 | Huber ....................................... 410/21 |
| 4,596,506 | 6/1986 | Burgardt et al. . |
| 4,611,961 | 9/1986 | Van Iperen et al. ..................... 410/20 |
| 4,659,266 | 4/1987 | Thelen et al. ............................ 410/10 |
| 4,786,223 | 11/1988 | Crissy et al. ............................. 410/20 |
| 4,863,390 | 9/1989 | Cera et al. . |
| 4,875,813 | 10/1989 | Moyer et al. ............................... 410/9 |
| 4,955,459 | 9/1990 | Murphy . |
| 4,960,353 | 10/1990 | Thorndyke ............................... 410/20 |
| 5,011,347 | 4/1991 | Bullock ....................................... 410/9 |
| 5,056,574 | 10/1991 | Maresh et al. . |
| 5,150,911 | 9/1992 | Williams . |
| 5,160,223 | 11/1992 | Seitz ............................................ 410/9 |
| 5,201,799 | 4/1993 | Johnson . |

(List continued on next page.)

FOREIGN PATENT DOCUMENTS

| | | |
|---|---|---|
| 0 327 212 | 9/1989 | European Pat. Off. . |
| 675784 | 2/1930 | France . |
| 916030 | 11/1946 | France . |
| 2459151 | 2/1981 | France . |
| 58-93656 | 6/1983 | Japan . |
| 194659 | 2/1965 | Sweden . |
| 7803163 | 10/1979 | Sweden . |
| 1364511 | 7/1988 | U.S.S.R. . |
| 1486382 | 6/1989 | U.S.S.R. . |
| WO 79/00130 | 3/1979 | WIPO . |

*Primary Examiner*—Stephen T. Gordon
*Attorney, Agent, or Firm*—Wood, Herron & Evans, L.L.P.

[57] ABSTRACT

A wheel restraint device incorporates a harness that receives first and second elongated straps used to secure a vehicle wheel to a support surface on which the wheel is supported. Each elongated strap is configured to extend over an upper outer surface of the wheel and be secured to the support surface proximate outer and inner sides of the wheel. The harness includes first and second sleeves that are respectively configured to slidably receive the first and second elongated straps. Moreover, the first and second sleeves extend at an angle relative to one another to orient the first and second elongated straps in a crossing relationship along one side of the wheel. With such an arrangement, it has been found that the tendency of the harness and/or the elongated straps to work themselves either over the upper outer surface of a wheel, or along the front or rear ends of the wheel, is significantly reduced. Furthermore, the arrangement oftentimes can be substantially faster and easier to install, thus reducing the time and effort expended by drivers or dock workers.

21 Claims, 3 Drawing Sheets

U.S. PATENT DOCUMENTS

| | | | |
|---|---|---|---|
| 5,261,687 | 11/1993 | Bergman . | |
| 5,294,221 | 3/1994 | Eller et al. | 410/30 |
| 5,302,063 | 4/1994 | Winsor | 410/30 |
| 5,312,213 | 5/1994 | Winsor | 410/9 |
| 5,330,148 | 7/1994 | Floyd | 410/20 X |
| 5,392,880 | 2/1995 | Christian . | |
| 5,584,622 | 12/1996 | Dickerson, Sr. | 410/21 |
| 5,586,849 | 12/1996 | Kissel et al. | 410/10 |
| 5,941,665 | 8/1999 | Dahlin | 410/20 |

WHEEL RESTRAINT DEVICE

FIELD OF THE INVENTION

The invention generally relates to the field of wheel restraint and vehicle restraint devices. In particular, the invention relates to a restraint device for restraining automobiles or trucks that are being transported on a trailer, truck, rail, or ship.

BACKGROUND OF THE INVENTION

The safe shipment of vehicles such as cars or light trucks from the manufacturing site to the distributor and ultimately to the customer has always provided a challenge. The mode of transportation for automobiles and light trucks in the past has been primarily by tractor-trailer or rail, or for imported cars from overseas, also by ship.

Traditionally, vehicles have been secured to the bed of a trailer, truck, train or ship using sets of chains. The chains are secured to the floor or bed of the transport vehicle and are attached to a portion of the frame of the transported vehicle. Specifically, a loop or hook of some type has traditionally been welded on some portion of the transported vehicle, so that the vehicle can be "tied down" by chains for transport. However, chains are typically metallic in nature, and can rust from exposure to the weather. Rusting can cause the chains to develop weak points and thereafter break, resulting in movement of the vehicles on the platform, which can damage the vehicles and create safety hazards. Particularly if vehicles are being transported by a truck, vehicles could fall off the trucks, injuring or killing occupants in other vehicles.

Securing vehicles through their frames also presents a problem in that the suspensions of the transported vehicles may permit the frames of the vehicles to dip during transport, e.g., due to bumps in the road. Dipping can temporarily introduce slack in the chains, which subjects the chains to greater forces as the chains "snap" back taut.

Another problem associated with the use of chains is the difficulty that the drivers or dock loaders have in securing the chains to the vehicles. In order to attach the chains to the vehicles, it is often necessary to get under the car or truck and attach the chain to the car or truck, which can be a difficult and a dirty job. Thus, a significant need has long existed for an easier and more reliable manner of attaching vehicles to platforms for transit.

U.S. Pat. No. 5,586,849 to Kissel et al. (which is assigned to the same assignee as the present application, and which is incorporated by reference herein) discloses a vehicle restraint system in which flexible strapping material is used to directly secure one or more wheels of a vehicle to a support surface such as a floor or bed. An upper restraint is supported on an upper outer surface of a wheel, with a pair of inner flexible members and a pair of outer flexible members coupled to and extending from the upper restraint on inner and outer sides of the wheel, respectively. The ends of the flexible members are secured to the support surface, with the outer flexible members crossing one another across the outwardly facing surface of the wheel. In addition, a pair of lower restraints are coupled between the inner and outer flexible members to engage the lower surface of the wheel, functioning much like "chocks" that resist rotation of the wheel.

The aforementioned vehicle restraint system has the advantages of being economical and light weight, and being capable of working on a wide variety of vehicle types, regardless of the surrounding mechanical components and body panels which surround the wheel wells of a vehicle. The vehicle restraint system also is simpler to install than chains, and forms a more reliable restraint that allows the suspension of the transported vehicle to float without the restrictions imposed by chains.

One drawback with such a vehicle restraint system, however, is that the upper restraint, which is typically formed of an H-shaped arrangement of flexible strapping material that slidably receives the inner and outer flexible members, has been found to work its way up and over the upper surface of the wheel and toward the back side thereof in some circumstances. Doing so can compromise the integrity of the restraint, and can also cause the restraint system to become entangled with vehicle workings near the back side of the wheel.

Furthermore, the arrangement of flexible strapping material in the restraint system can also be somewhat cumbersome to properly position over a wheel. As such, drivers or dock workers may need to expend excessive time and effort in installing the restraint system. Furthermore, added difficulty often increases the risk of improper installation, thus also increasing the risk that a restraint could fail.

Therefore, a significant need continues to exist in the art for an improved manner of securing vehicles to platforms for transit, and in particular for a manner of securing vehicles that is both reliable, and quick and simple to install.

SUMMARY OF THE INVENTION

The invention addresses these and other problems associated with the prior art by providing a wheel restraint device that incorporates a harness that receives first and second elongated straps used to secure a vehicle wheel to a support surface on which the wheel is supported. Each elongated strap is configured to extend over an upper outer surface of the wheel and be secured to the support surface proximate outer and inner sides of the wheel. The harness includes first and second sleeves that are respectively configured to slidably receive the first and second elongated straps. Moreover, the first and second sleeves extend at an angle relative to one another to orient the first and second elongated straps in a crossing relationship along one side of the wheel. With such an arrangement, it has been found that the tendency of the harness and/or the elongated straps to work themselves either over the upper outer surface of a wheel, or along the front or rear ends of the wheel, is significantly reduced. Furthermore, the arrangement oftentimes can be substantially faster and easier to install, thus reducing the time and effort expended by drivers or dock workers These and other advantages and features, which characterize the invention, are set forth with particularity in the claims appended hereto and forming a further part hereof. However, for a better understanding of the invention, and the advantages and objectives obtained by its use, reference should be made to the drawings, and to the following descriptive matter, in which there is described an illustrative embodiment of the invention.

DETAILED DESCRIPTION

Broadly, the invention is directed to an apparatus which secures and restrains a tire or wheel of a vehicle in place. In particular, when used in combination with an automobile or truck, embodiments consistent with the invention engage one or more wheels of the vehicle, and restrict movement of the restrained vehicle vis-a-vis the platform or bed of the truck trailer, train or ship (generally, a "transportation vehicle") moving the restrained vehicle. Embodiments consistent with the invention may be quickly put in place on a vehicle, and are operator friendly, lightweight and secure. Furthermore, the embodiments may be used on vehicles having minimal clearance between the tire and the fender or wheel skirt.

Figure 1:
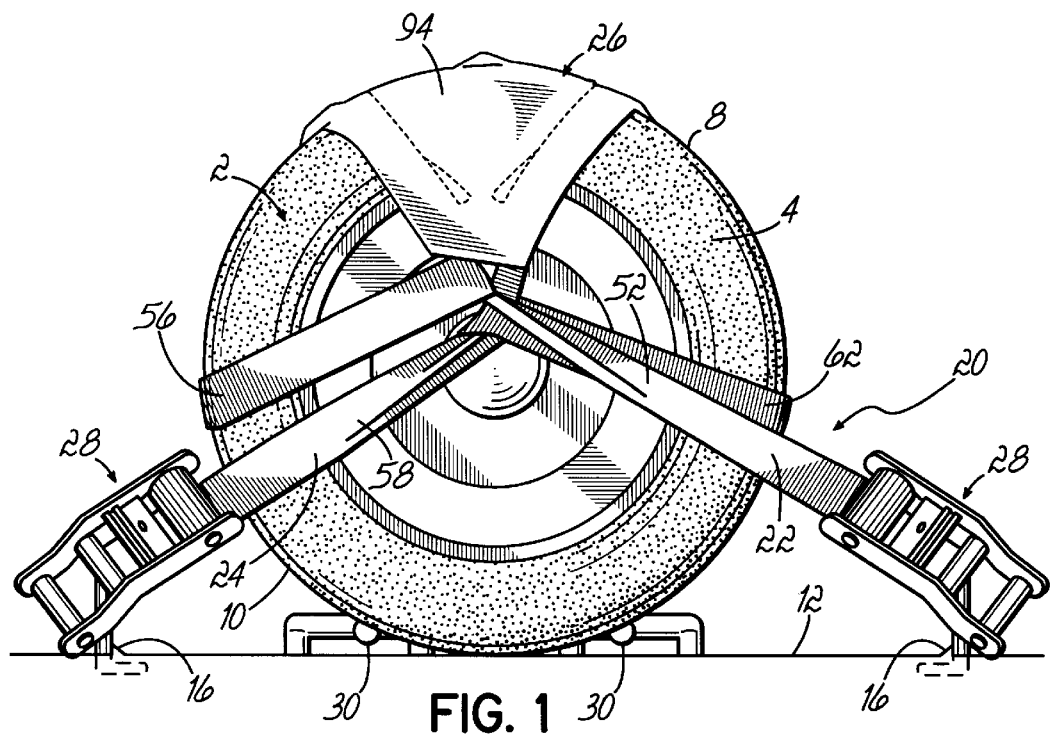
FIG. 1 is an elevational view of a wheel restraint device consistent with the invention, taken from an outer side of a wheel secured to a support surface by the wheel restraint device.
Figure 2:
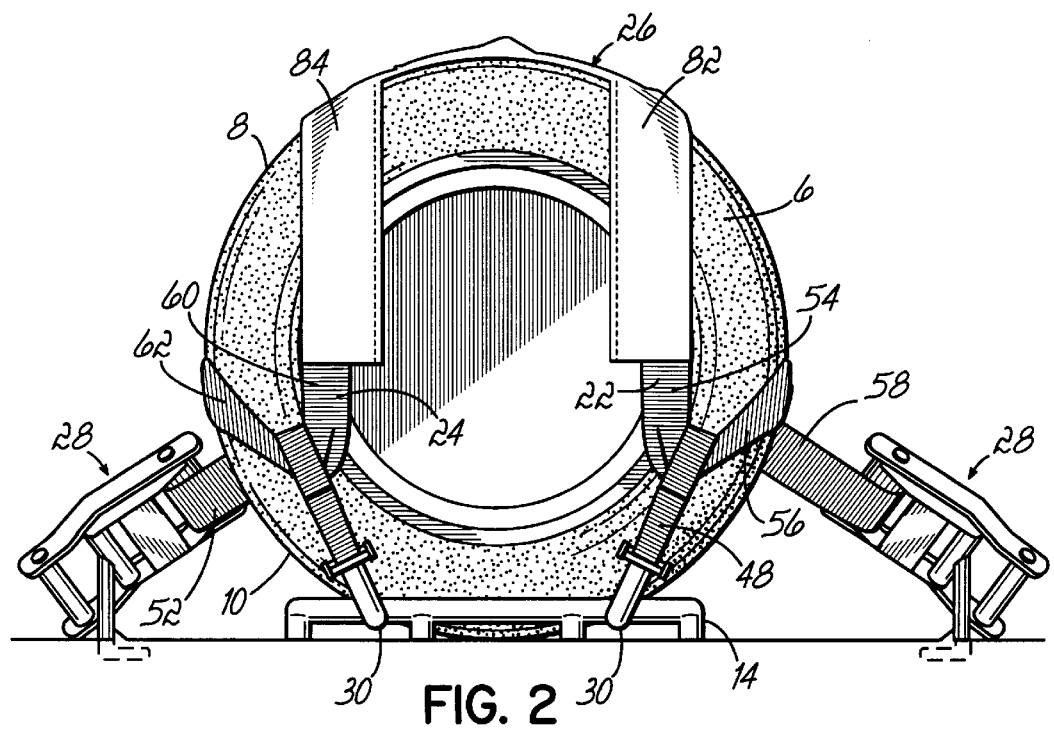
FIG. 2 is an elevational view of the wheel restraint device of FIG. 1, taken from an inner side of the wheel secured to the support surface by the wheel restraint device.

Turning to the Drawings, wherein like numbers denote like parts throughout the several views, FIGS. 1 and 2 illustrate a wheel 2 from outer and inner sides 4, 6 thereof, respectively. Wheel 2 further includes an upper outer surface 8 and a lower outer surface 10, and is illustrated as supported on a support surface 12, e.g., the floor or bed of a trailer, truck, railcar or ship, among others.

A wheel restraint device 20 consistent with the invention is illustrated in an operative position overlying wheel 2 and securing the wheel to support surface 12. Device 20 includes a pair of elongated straps 22, 24 slidably received in a harness 26 and secured to support surface 12 via pairs of outer and inner securing mechanisms 28, 30.

Figure 3:
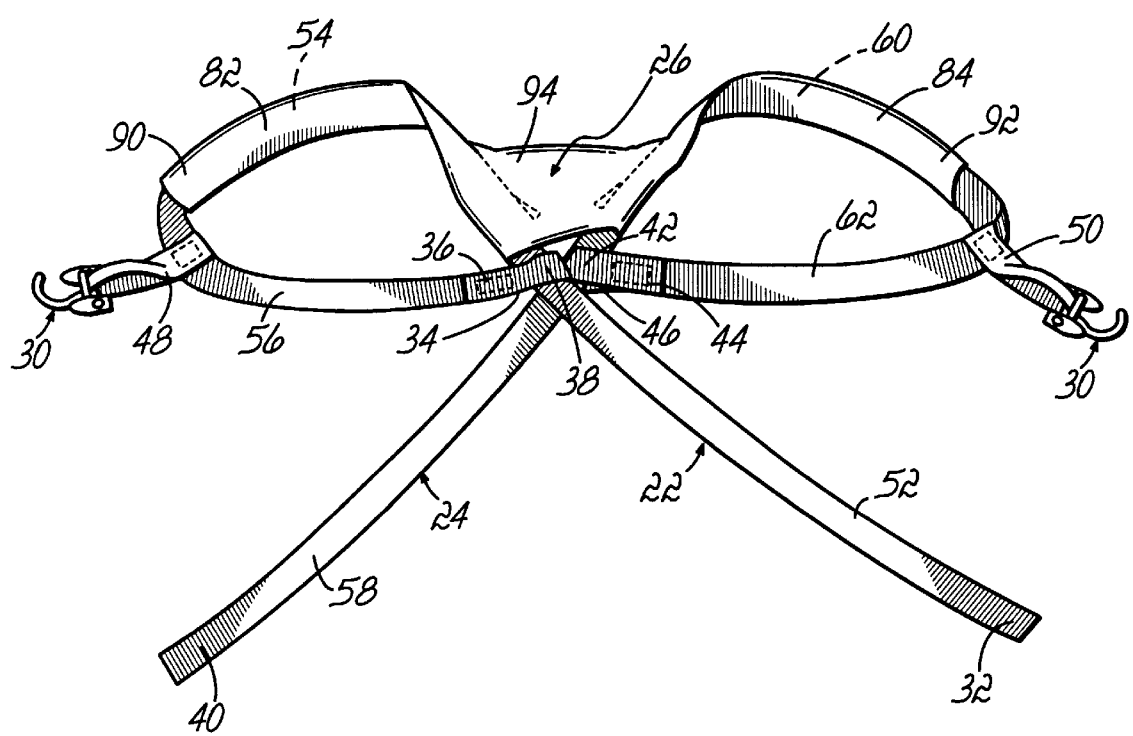
FIG. 3 is a perspective view of the wheel restraint device of FIG. 1, with the outer securing mechanisms removed for clarity

As best shown in FIG. 3, elongated strap 22 includes a first end 32 and a second end 34. The second end 34 is doubled back over itself and secured at 36 (e.g., via stitching) to form a loop 38 through which the first end 32 is slidably received. Likewise, elongated strap 24 includes a first end 40 and a second end 42, which is doubled back over itself and secured at 44 to form a loop 46 through which the first end 40 is slidably received.

A pair of mounting straps 48, 50 are respectively secured to elongated straps 22, 24, either through a fixed engagement (e.g., via stitching) or through a slidable engagement (e.g., via a loop formed at one end of the mounting strap). With this configuration, elongated strap 22 is partitioned into three portions, an outer portion 52 (extending generally between the slidable engagement with loop 38 and first end 32), an inner portion 54 (extending generally between the slidable engagement with loop 38 and mounting strap 48), and a lower restraint portion 56 (extending generally between mounting strap 48 and loop 38). Elongated strap 24 is likewise partitioned into an outer portion 58, an inner portion 60 and a lower restraint portion 62.

Elongated straps 22, 24 and mounting straps 48, 50 may be constructed of flexible strapping material, e.g., nylon strapping material available from Kynedine and others, and are secured together by means of sewing. Other materials and constructions may be used in the alternative.

Figure 4:
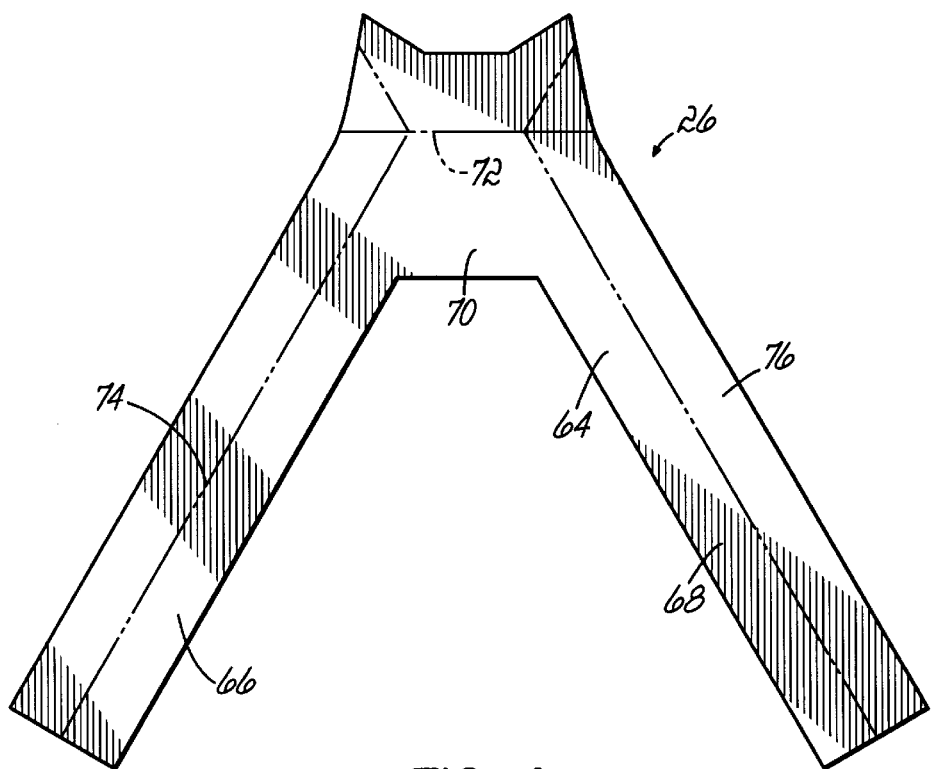
FIG. 4 is a plan view of a blank used to construct the harness from the wheel restraint device of FIG. 1.
Figure 5:
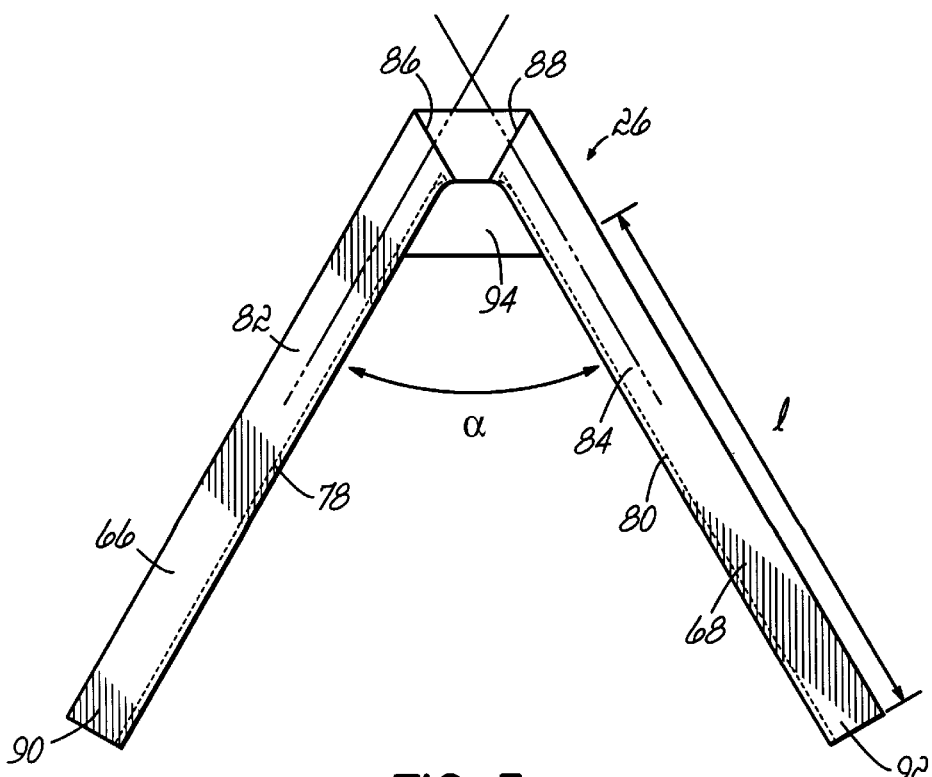
FIG. 5 is a plan view of the harness of FIG. 1, after folding and sewing operations performed on the blank of FIG. 4.

Overlaying at least part of the inner portions 54, 60 of straps 22, 24 is a harness 26, the configuration of which is best illustrated in FIGS. 4 and 5. As shown in FIG. 4, for example, harness 26 may be formed of a V-shaped blank 64, constructed of a relatively strong material such as reinforced vinyl (e.g., 22 ounce reinforced vinyl such as marketed under the brand name "Coverlite"). Blank 64 includes a pair of legs 66, 68 integrally joined through a connecting region 70. To form the harness, blank 64 is first folded transversely along a fold line 72 in connecting region 70, and then folded lengthwise along each leg 66, 68 and a respective fold line 74, 76. As shown in FIG. 5, after folding, a pair of seams 78, 80 are defined along legs 66, 68. A sleeve 82, 84 is defined on each leg 66, 68 by joining the overlapping material at each seam 78, 80, e.g., via sewing.

Each sleeve 82, 84 defines a channel for slidably receiving one of elongated straps 22, 24. Each sleeve 82, 84 includes a first end 86, 88 and a second end 90, 92, with a connecting member 94 defined by connecting region 70 and operating to integrally secure sleeves 82, 84 together proximate first ends 86, 88 thereof.

Returning now to FIG. 3, harness 26 slidably receives elongate straps 22, 24 within sleeves 82, 84, respectively. Typically, such sliding arrangement is along the inner portions 54, 60 of straps 22, 24. Furthermore, as will become more apparent below, each sleeve 82, 84 typically extends a substantial distance along the respective inner portion 54, 60 to restrict movement of the harness through abutment of second ends 90, 92 of the sleeves with mounting straps 48, 50. Typically, to assemble harness 26 with elongate straps 22, 24, the first ends 32, 40 of straps 22, 24 are respectively slid through second ends 90, 92 of sleeves 82, 84, and then the first ends 32, 40 are slid through loops 38, 46 defined at the second ends 34, 42 of the straps 22, 24, such that harness 26 is disposed intermediate mounting straps 48, 50 and the slidable engagements between the first and second ends of each strap.

Returning to FIGS. 1 and 2, installation of device 20 on wheel 2 is now described. Typically, device 20 is secured over wheel 2 by outer and inner securing mechanisms 28, 30 that respectively secure the device to support surface 12 on the outer and inner sides 4, 6 of wheel 2. The inner securing mechanisms 30 may be implemented, for example, as L-hooks that include L-shaped bars capable of engaging a rail 14 disposed along the support surface proximate inner side 6 of wheel 2 (as described in the aforementioned Kissel et al. patent) In the alternative, the L-hooks can engage a perforation formed in support surface 12. Moreover, in other embodiments, any of the various quick-connect hooks described in the aforementioned Kissel et al. patent may be used in the alternative.

The outer securing mechanisms 28 may include a tightening or adjustment mechanism such as ratchet (e.g., a Kynedine 804 ratchet or equivalent) that varies the effective length of the respective elongated strap 22, 24 to tighten the device around the wheel. Other known tensioning or tightening mechanisms may be used in the alternative. Each ratchet may be secured to support surface 12 via an L-hook inserted through a perforation 16 defined in the support surface 12, as is shown and described in the aforementioned Kissel et al. patent. In the alternative, the ratchets may be secured to other supporting structure, e.g., using any of the quick-connect hook designs or other coupling mechanisms discussed in the aforementioned Kissel et al. patent. Moreover, the adjustment mechanism for the device may be disposed on the inner securing mechanisms, albeit with comparatively lesser accessibility.

To install device 20 on wheel 2, the device is first placed over the wheel with harness 26 overlaying the upper outer surface 8 of wheel 2, with outer portions 52, 58 of straps 22, 24 extending along outer side 4 of wheel 2, and with inner portions 54, 60 of straps 22, 24 extending along inner side 6 of wheel 2. Inner portions 54, 60 of straps 22, 24 are then connected to support surface 12 along inner side 6 using inner securing mechanisms 30, and outer portions 52, 58 of straps 22, 24 are connected to support surface 12 along outer side 4 using outer securing mechanisms 28. Lower restraint portions 56, 62 of straps 22, 24 are then positioned to abut the lower outer surface 10 of wheel 2, and the adjustment mechanisms in outer securing mechanisms 28 are actuated to shorten the effective lengths of straps 22, 24. By shortening the effective lengths, straps 22, 24 pull downward to hold down wheel 2, and lower restraints 56, 62 are pulled taut to "chock" wheel 2 by resisting its rotation or sliding.

Removal of device 20 is generally the reverse of installation. First, the adjustment mechanisms in outer securing mechanisms 28 are released. Then, the outer and inner securing mechanisms 28, 30 are detached from the support surface, permitting the device to be removed from the wheel.

As can be best seen from FIGS. 1 and 2, harness 26 serves to maintain outer portions 52, 58 of straps 22, 24 in a crossing relationship. Moreover, by orienting the straps in the crossing relationship, the harness deters the straps from separating from one another and working themselves around the wheel, or from otherwise falling down (even when no tension is applied) to either the forward or rear ends of the wheel. It is also believed that the harness assists in actively assisting in securing the wheel to the support surface, resulting in applied forces being spread over a relatively larger surface area, and increasing the reliability and safety of the device.

Returning to FIG. 4, sleeves 82, 84 extend outwardly from one another in the direction of their respective second ends 90, 92, at an angle identified at α, thereby orienting the elongated straps 22, 24 in a crossing relationship with one another when received in the sleeves. In the illustrated embodiment, the angle α is an acute angle, preferably between about 40 and about 50 degrees, more preferably about 45 degrees. Other angles that induce a crossing arrangement between a pair of slidably received elongate straps may be better suited for other applications, and thus may also be used consistent with the invention. Typically, the working angle will be determined by the tire/wheel size with which the device will be used.

As is also seen in FIG. 4, sleeves 82, 84 have a length l that preferably is sufficient to assist in restricting the movement of the harness up and over the wheel toward the inner side thereof. Specifically, length l is preferably selected such that the second ends 90, 92 of the sleeves 82, 84 will abut mounting straps 48, 50 (or other suitable structure on the inner side of the wheel prior to movement of the harness past a point at which connecting member 94 is fully disposed along the inner side of the wheel. Put another way, the sleeves are provided with a length sufficient to maintain the connecting member at least partially overlaying the upper outer surface 8 of the wheel.

In the illustrated embodiment, each sleeve has a length l of about 29 to 30 inches, preferably about 29½ inches, which, when the device is secured to a vehicle wheel incorporating a 13 inch rim (typically the smallest wheel utilized on passenger vehicles), results in nearly all of the inner portions 54, 60 of straps 22, 24 being received within the sleeves. When device 20 is utilized on larger wheels, some gap between ends 90, 92 and mounting straps 48, 50 may exist, although enough movement of harness 26 toward the inner side of the wheel may result in ends 90, 92 abutting the mounting straps to prevent further movement in that direction. Also, typically each first portion 52, 58 of straps 22, 24 will need to project from sleeves 82, 94 at least about 24 inches (for single wheels with 13 inch rims) up to at least about 45 inches (for dual wheels with 16 inch rims), although other lengths may be appropriate in other embodiments.

It will be appreciated that device 20 may be specifically configured to operate with larger wheel sizes, and thus be provided with a relatively longer length l. Moreover, in some implementations, only one sleeve may need to be elongated to provide essentially the same operation. In other embodiments, simply the V-shape of the harness may be sufficient to prevent unwanted movement of the harness, whereby sleeves 82, 84 may be substantially shorter.

Another advantage of device 20 is that harness 26 maintains the straps in a relatively neater and less cumbersome arrangement. As such, alignment of the device over a wheel is relatively easier and faster than with prior designs.

Various modifications may be made to the illustrated embodiments without departing from the spirit and scope of the invention. For example, while the lower restraints are illustrated as being integrally formed on straps 22, 24, in other embodiments, the lower restraints may be formed of separate flexible members. Also, a wide variety of the modifications discussed in the aforementioned Kissel et al. patent may also apply to device 20.

Other modifications will be apparent to one of ordinary skill in the art. Therefore, the invention lies in the claims hereinafter appended.

What is claimed is:

1. A device for restraining a wheel on a vehicle to a support surface on which the wheel is supported, the device comprising:
    (a) first and second elongated straps, each elongated strap configured to extend over an upper outer surface of the wheel and be secured to the support surface proximate outer and inner sides of the wheel; and
    (b) a harness including first and second sleeves respectively configured to slidably receive the first and second elongated straps, with the first and second sleeves extending at an angle relative to one another to orient the first and second elongated straps in a crossing relationship along one side of the wheel, wherein the first and second sleeves each include first and second ends, and wherein the harness further includes a connecting member configured to secure the first and second sleeves to one another proximate the first ends thereof, and with the first ends of the first and second sleeves separated from one another by a smaller separation than the second ends thereof.

2. The device of claim 1, further comprising a lower restraint coupled at first and second ends thereof to the first elongated strap and configured to abut a lower outer surface of the wheel.

3. The device of claim 2, further comprising a second lower restraint coupled at first and second ends thereof to the second elongated strap and configured to abut the lower outer surface of the wheel opposite the first lower restraint.

4. The device of claim 1, wherein the elongated straps are formed from flexible strapping material.

5. The device of claim 1, further comprising inner and outer securing mechanisms respectively configured to secure each elongated strap to the support surface proximate the outer and inner sides of the wheel.

6. The device of claim 5, wherein the outer securing mechanism is adjustable to adjust tension in the elongated straps.

7. The device of claim 6, wherein the outer securing mechanism includes first and second ratchets respectively configured to vary the effective length of the first and second elongated straps.

8. The device of claim 7, wherein the outer securing mechanism further includes first and second L-hooks respectively coupled to the first and second ratchets.

9. The device of claim 1, wherein the first and second sleeves extend at an acute angle relative to one another.

10. A device for restraining a wheel on a vehicle to a support surface on which the wheel is supported, the device comprising:

(a) first and second elongated straps, each elongated strap configured to extend over an upper outer surface of the wheel and be secured to the support surface proximate outer and inner sides of the wheel;

(b) a harness including first and second sleeves coupled to one another through a connecting member, the first and second sleeves respectively configured to slidably receive the first and second elongated straps, with the first and second sleeves extending at an angle relative to one another to orient the first and second elongated straps in a crossing relationship along one side of the wheel, wherein the first and second sleeves each include first and second ends, wherein the connecting member is configured to secure the first and second sleeves to one another proximate the first ends thereof, and with the first ends of the first and second sleeves separated from one another by a smaller separation than the second ends thereof; and (c) inner and outer securing mechanisms respectively configured to secure each elongated strap to the support surface proximate the outer and inner sides of the wheel.

11. The device of claim 1, wherein the harness is configured to overlay the upper outer surface of the wheel, and wherein the first sleeve is configured to extend beyond the connecting member in a direction along the inner side of the wheel to restrict movement of the harness in a direction toward the inner side of the wheel.

12. The device of claim 1, wherein each of the first and second sleeves is configured to extend about 29 to about 30 inches beyond the connecting member in the direction along the inner side of the wheel.

13. The device of claim 1, wherein the connecting member is integrally joined to the first and second sleeves.

14. The device of claim 13, wherein the harness comprises a single V-shaped blank of reinforced vinyl material including first and second legs, wherein the first and second sleeves are formed by respectively folding the first and second legs over lengthwise and sewing along the seams defined thereby.

15. A device for restraining a wheel on a vehicle to a support surface on which the wheel is supported, the device comprising:

(a) first and second elongated straps, each elongated strap configured to extend over an upper outer surface of the wheel and be secured to the support surface proximate outer and inner sides of the wheel; and (b) a harness including first and second sleeves respectively configured to slidably receive the first and second elongated straps, with the first and second sleeves extending at an angle relative to one another to orient the first and second elongated straps in a crossing relationship along one side of the wheel, wherein the first and second sleeves extend at an acute angle relative to one another.

16. The device of claim 15, further comprising:

(a) a first lower restraint coupled at first and second ends thereof to the first elongated strap and configured to abut a lower outer surface of the wheel; and (b) a second lower restraint coupled at first and second ends thereof to the second elongated strap and configured to abut the lower outer surface of the wheel opposite the first lower restraint.

17. The device of claim 15, wherein the elongated straps are formed from flexible strapping material.

18. The device of claim 15, further comprising inner and outer securing mechanisms respectively configured to secure each elongated strap to the support surface proximate the outer and inner sides of the wheel, wherein the outer securing mechanism is adjustable to adjust tension in the elongated straps, and wherein the outer securing mechanism includes first and second ratchets respectively configured to vary the effective length of the first and second elongated straps, and first and second L-hooks respectively coupled to the first and second ratchets.

19. The device of claim 15, wherein the first and second sleeves each include first and second ends, wherein the harness further includes a connecting member configured to secure the first and second sleeves to one another proximate the first ends thereof, and with the first ends of the first and second sleeves separated from one another by a smaller separation than the second ends thereof.

20. The device of claim 19, wherein the harness is configured to overlay the upper outer surface of the wheel, wherein the first sleeve is configured to extend beyond the connecting member in a direction along the inner side of the wheel to restrict movement of the harness in a direction toward the inner side of the wheel, and wherein each of the first and second sleeves is configured to extend about 29 to about 30 inches beyond the connecting member in the direction along the inner side of the wheel.

21. The device of claim 19, wherein the connecting member is integrally joined to the first and second sleeves, wherein the harness comprises a single V-shaped blank of reinforced vinyl material including first and second legs, and wherein the first and second sleeves are formed by respectively folding the first and second legs over lengthwise and sewing along the seams defined thereby.

* * * * *